(12) United States Patent
Wu et al.

(10) Patent No.: US 6,511,235 B2
(45) Date of Patent: Jan. 28, 2003

(54) INTEGRATED SURFACE-EMITTING OPTOELECTRONIC MODULE AND THE METHOD FOR MAKING THE SAME

(75) Inventors: Weng-Jin Wu, Shinjuang (TW); Yih-Der Guo, Hsinchu (TW); Tsung-Hsuan Chiu, Hsinchu (TW); Rong-Heng Yuang, Hsinchu (TW); Mu-Tao Chu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 2 days.

(21) Appl. No.: 09/745,152

(22) Filed: Dec. 19, 2000

(65) Prior Publication Data

US 2002/0037137 A1 Mar. 28, 2002

(30) Foreign Application Priority Data

Sep. 22, 2000 (TW) .......................................... 89119590

(51) Int. Cl.$^7$ .................................................. G02B 6/36
(52) U.S. Cl. ............................. 385/88; 385/89; 385/49
(58) Field of Search ......................... 385/88–89, 47–49, 385/52, 92–93

(56) References Cited

U.S. PATENT DOCUMENTS

| 5,774,609 A | * | 6/1998 | Bäcklin et al. | ............... 385/49 |
| 5,984,534 A | * | 11/1999 | Elderstig et al. | ............... 385/90 |
| 5,987,202 A | * | 11/1999 | Gruewald et al. | ............. 385/49 |
| 6,257,772 B1 | * | 7/2001 | Nakanishi et al. | ............. 385/89 |

* cited by examiner

Primary Examiner—Akm E. Ullah
Assistant Examiner—Jerry T Rahll
(74) Attorney, Agent, or Firm—W. Wayne Liauh

(57) ABSTRACT

The present invention pertains to an integrated surface-emitting optoelectronic module and the method for making the same. The yellow light procedure is performed to define a V-groove width for disposing an optical fiber on a silicon substrate. After dry etching a vertical groove, a dielectric layer is grown on the surface of the silicon substrate to protect the vertical wall, preventing the groove from getting wider due to subsequent wet etching. A 45-degree mirror surface is formed so that an optoelectronic device can be disposed on the mirror surface in the flip chip method. The optoelectronic module employs a complete silicon substrate to assemble a surface-emitting optoelectronic devices and an optical fiber by passive alignment, and therefore can be free from misalignment due to separate assembly.

12 Claims, 7 Drawing Sheets

INTEGRATED SURFACE-EMITTING OPTOELECTRONIC MODULE AND THE METHOD FOR MAKING THE SAME

BACKGROUND OF THE INVENTION

1. Field of Invention

The present invention relates to an integrated surface-emitting optoelectronic module and the method for making the same and, in particular, to an optoelectronic module that utilizes a complete silicon substrate to assemble a surface-emitting optoelectronic device and an optical fiber by passive alignment and the method for making the same.

2. Related Art

Optical alignment plays a very important role in optoelectronic device packaging and can be categorized into two types, namely, active alignment and passive alignment. Past optoelectronic device packaged products mainly employ the active alignment technology. Although the active alignment is featured in a high coupling efficiency, the packaging process is rather time-consuming, forming a defect for mass production. Therefore, optoelectronic module technology researches have been focused on the passive alignment technology in recent years.

Passive alignment of edge-emitting photonic devices has been disclosed in many literatures (see, for example, M. J. Wale, "Self aligned flip chip assembly of photonic devices with electrical and optical connections," IEEE 40th Electronic Components and Technology 1, (1990) 34–41, etc.). The structure is commonly formed by simultaneously disposing an optoelectronic device and an optical fiber on the same silicon chip and then packaging them by passive alignment, as disclosed in the U.S. Pat. Nos. 5,163,108, 5,182,782, 5,268,066, and 5,436,996. The U.S. Pat. No. 5,420,953 further adds a convergent device between the optoelectronic device and the optical fiber. However, the surface-emitting photonic devices, such as the vertical cavity surface-emitting laser (VCSEL) and the laser-emitting diode (LED), cannot directly use the packaging method for side-emitting photonic devices. Although the passive alignment technology for such devices had been disclosed in the U.S. Pat. Nos. 5,896,481 and 5,259,054, the structure is modularized; that is, the photonic device and the optical fiber are separately disposed and then assembled together. The advantage of this method is that the optoelectronic devices can be directly welded on the substrate in alignment with the optical fiber. Yet, this assembly method still suffers from the problem of nontrivial alignment. The U.S. Pat. No. 5,905,831 proposes another method to solve the problem of VCSEL flip chip assembly; nevertheless, the optoelectronic device and the optical fiber are still separately disposed.

Regarding the packaging of surface-emitting photonic devices, the U.S. Pat. Nos. 4,954,400 and 5,627,931 propose a method to use silicon (Si) to etch a 54.7-degree mirror surface to be a VCSEL or LED reflecting surface. The 54.7-degree mirror surface may not be able to produce total reflection within the optical fiber. Therefore, the 54.7-degree mirror surface is only suitable for the LED but the VCSEL. Although the above patents mention that a 45-degree mirror surface can be used instead, they do not provide an explicit method. One literature also proposes to use a mirror surface to reflect light output from the VCSEL to the optical fiber (J. Heinrich, M. Rode, K. Pressmar, E. Zeeb, "Low-cost VCSEL-transceiver module for optical data busses," Lasers and Electro-Optics Society Annual Meeting, 1997. LEOS '97 10th Annual Meeting. Conference Proceedings., IEEE 2, (1996) 58–59.), it nevertheless does not mention the manufacturing method and the structure. The U.S. Pat. No. 5,696,862 discloses a packaging technology for surface-emitting lasers. However, the structure is rather complicated and not suitable for mass production. The U.S. Pat. Nos. 5,896,481 and 5,905,831 also propose a modularized surface-emitting photonic device assembly technology. One can see from the above description that the passive alignment for assembling a surface-emitting photonic device and an optical fiber on the same substrate has not had a clear structure yet.

As to making a 45-degree mirror surface on a silicon substrate to reflect incident light from a surface-emitting photonic device with a flip chip, some literatures concerning about mirror reflection suggest to use instead a 54.74-degree mirror surface to reflect light from the optical fiber by the mirror surface to the LED. The 54.74-degree mirror surface is suitable for light-receiving devices but not light-emitting devices (D. J. Sadler, M. J. Garter, C. H. Ahn, S. Koh, and A. L. Cook, "Optical reflectivity of micromachined {111}-oriented silicon mirrors for optical input-output couplers," J. Micromech. Microeng. 7 (1997) 263–269). Some other literatures propose to use a 45-degree mirror surface as a reflecting surface but do not explain the explicit structure (C. Strandman, L. Rosengren, H. G. A. Elderstig and Y. Backlund, "Fabrication of mirrors together with well-defined V-grooves using wet anisotropic etching of silicon," J. Microelectromechanical Systems 4, No. 4 (1995) 213–219).

The known development in 45-degree mirror surfaces is mainly in the silicon chip technology. Conventionally, the optoelectronic packaging mainly etches a V-groove from the Si(100) surface toward the (111) surface, which subtends 54.74 degrees with the (100) surface for accommodating an optical fiber. However, the 54.74-degree surface is not ideal for the reflecting surface of surface-emitting optoelectronic devices when considering the optical transmission path. Furthermore, in spite of the fact that the technology of etching 45-degree mirror surfaces (111) and (110) on the Si(100) surface has been disclosed in many literatures, the actual application in optoelectronic substrates, however, has an important problem. That is, the undercut during wet etching will result in a wider V-groove than the originally designed mask after the etching is completed.

SUMMARY OF THE INVENTION

Therefore, it is an object of the invention to provide a substrate structure that employs passive alignment and is free from the packaging problem of surface-emitting optoelectronic devices and the method for making the same.

Pursuant to the above-mentioned object, the invention provides a manufacturing method for an integrated surface-emitting optoelectronic module that utilizes passive alignment to achieve the coupling between the optoelectronic device and the optical fiber. The method comprises the steps of: (1) applying photoresist over a silicon substrate and defining V-groove areas needed for disposing an optical fiber using photolithography procedure; (2) etching a vertical groove in the areas of the V-grooves by dry etching and removing the photoresist afterwards; (3) growing a layer of dielectric on the silicon substrate using a furnace; (4) covering the substrate with photoresist On the other hand, the invention also provides an integrated surface-emitting optoelectronic module manufactured according to the above method.

According to the disclosed manufacturing method, the procedure further disposes a dielectric layer over the silicon substrate to protect the vertical walls, preventing the groove from getting wider due to subsequent wet etching. The integrated surface-emitting optoelectronic module packages a surface-emitting optoelectronic device and an optical fiber on the same substrate by a flip chip, thus reducing the misalignment problem due to separate assemblies.

Other features and advantages of the present invention will be apparent from the following detailed description, which proceeds with reference to the accompanying drawings.

DETAILED DESCRIPTION OF THE INVENTION

Figure 1A:
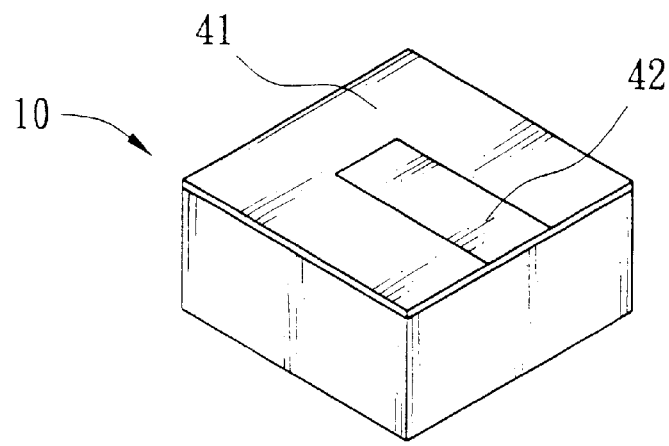
FIGS. 1A through 1I show schematic view of the steps of making an optoelectronic silicon optical subassembly (OSA) substrate according to the disclosed method.
Figure 1B:
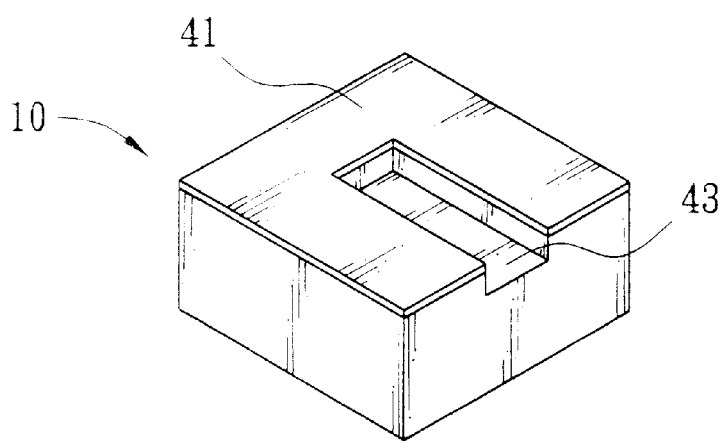
Figure 1C:
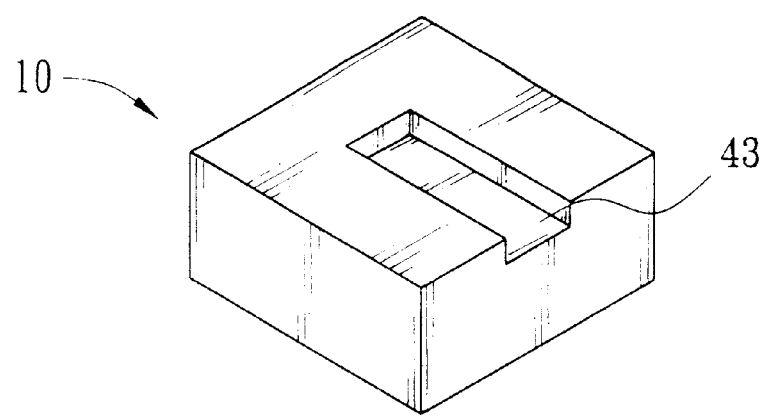
Figure 1D:
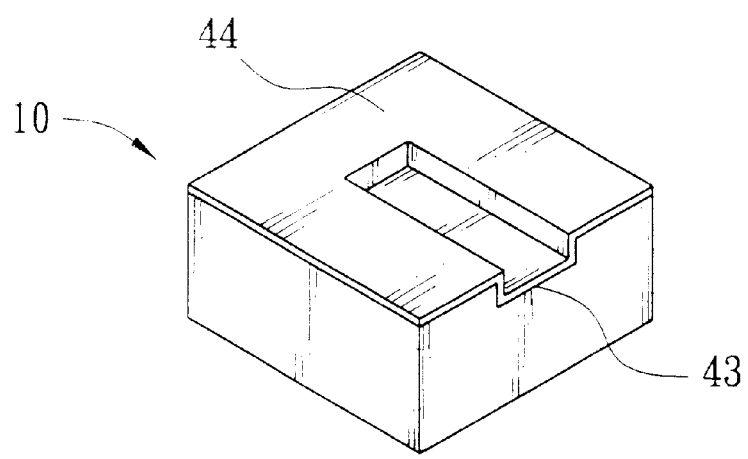
Figure 1E:
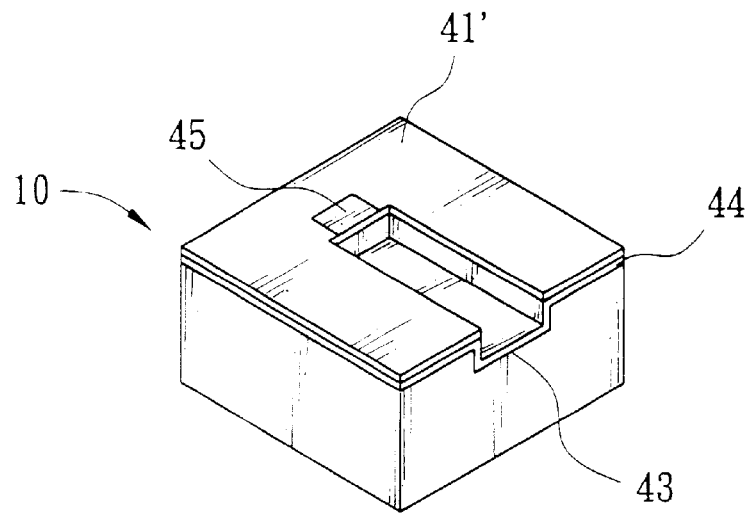
Figure 1F:
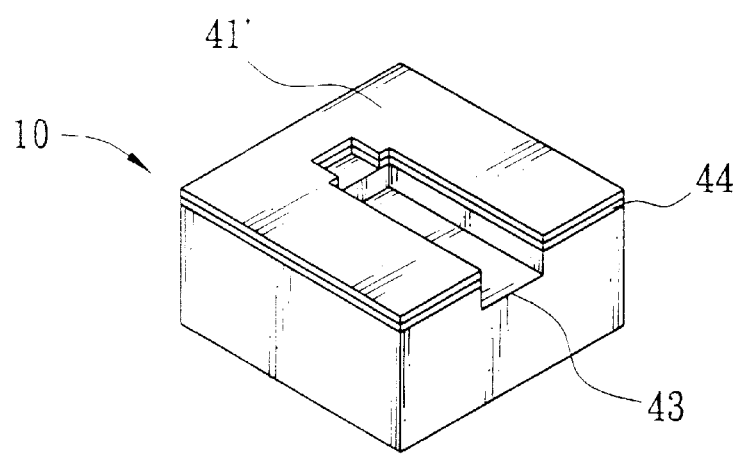
Figure 1G:
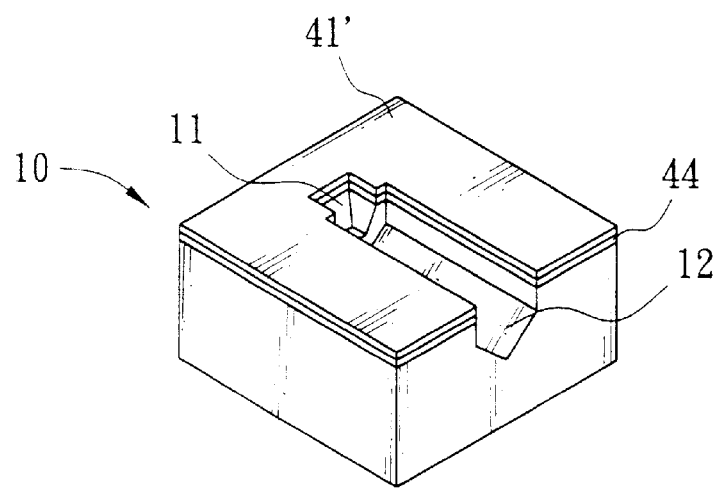
Figure 1H:
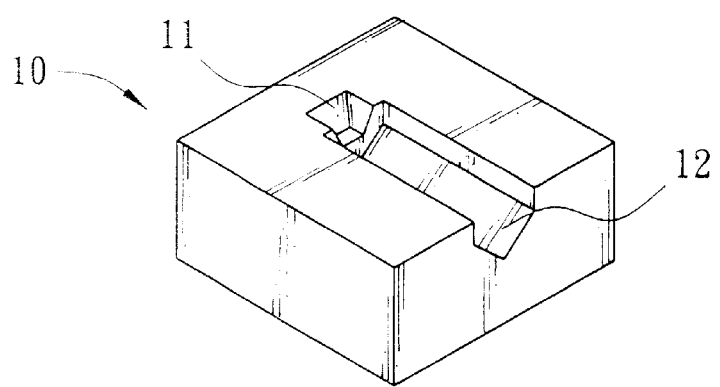
Figure 1I:
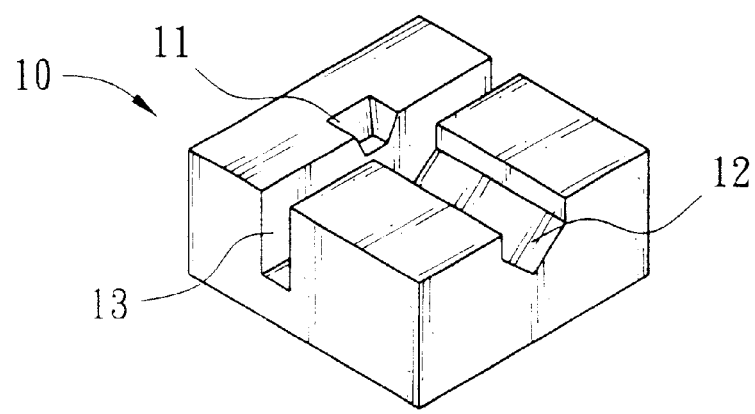

The invention uses a complete silicon substrate to support a photonic device and an optical fiber. The crystalline surface of the silicon substrate is chosen to be the (100) surface or a surface that is different from the (100) surface by 9.74 degrees, as shown in FIG. 1I. The manufacturing steps are:

applying photoresist 41 on a silicon substrate 10 and defining a groove area with a sufficient width for making a V-groove using the photolithography procedure, as shown in FIG. 1A;

making a vertical groove 43 in the defined groove area 42 by dry etching, as shown in FIG. 1B;

removing the photoresist 41 applied in step (1), as shown in FIG. 1C;

growing a dielectric layer 44, whose material can be silicon oxide or silicon nitride, on a surface of the silicon substrate 10 using a furnace for forming a protection layer for subsequent etching, as shown in FIG. 1D;

covering non-vertical groove area with photoresist 41' using the photolithography procedure, i.e., removing the photoresist 41' in the vertical groove area 43 and defining a mirror surface area 45 needed for a surface-emitting optoelectronic device, as shown in FIG. 1E;

removing the dielectric layer 44 from the horizontal area of the vertical groove 43 and the defined mirror surface area 45 by dry etching, as shown in FIG. 1F;

etching a V-groove 12 at the vertical groove 43 by wet etching and making a 45-degree reflection mirror 11 in the defined mirror surface area 45 by etching from the Si(100) toward the (110) surface or etching from the a surface deviated from the Si(l00) surface by 9.74 degrees toward the (111) surface, as shown in FIG. 1G;

removing the photoresist 41' and the dielectric layer 44 covering the silicon substrate 10, as shown in FIG. 1H;

cutting at the end of the V-groove 12 a groove 13 that is perpendicular to the V-groove 12 by using a diamond saw to be a fixed end of the optical fiber.

This then completes the base 10 needed by the optoelectronic module of the invention.

Figure 2:
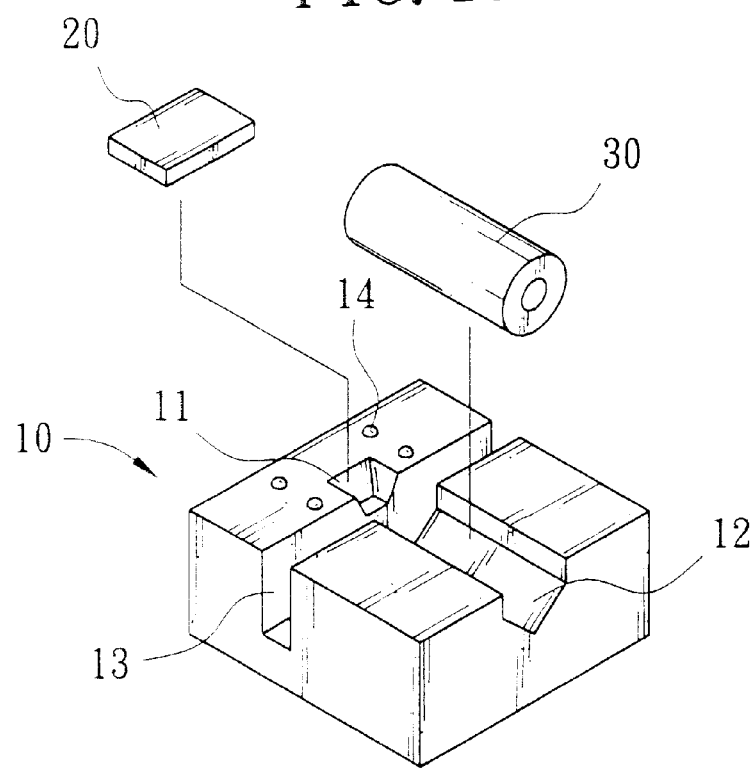
FIG. 2 is a schematic view showing the relative relations of all parts of the VCSEL, the optical fiber, and the OSA.
Figure 3:
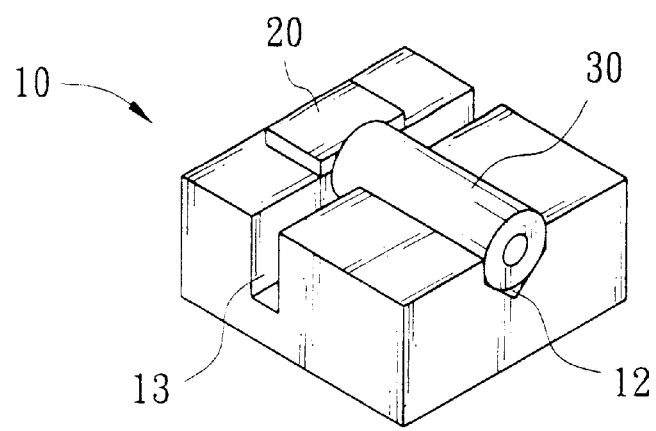
FIG. 3 is a schematic view showing the whole module assembly of the VCSEL, the optical fiber, and the OSA.
Figure 5:
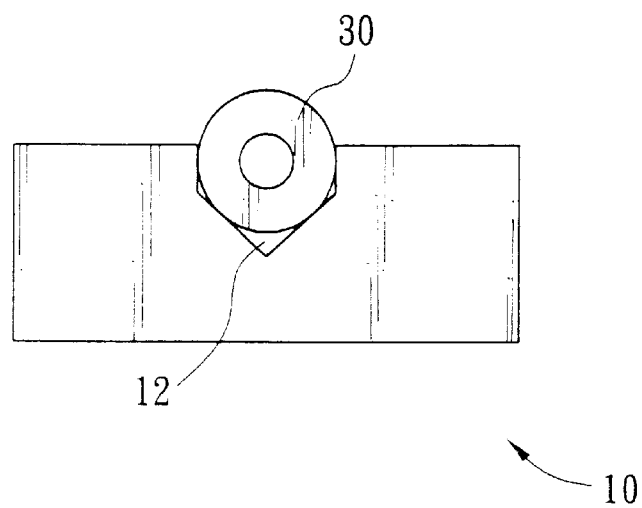
FIG. 5 shows a schematic cross-section of the special V-groove of FIG. 3.
Figure 6:
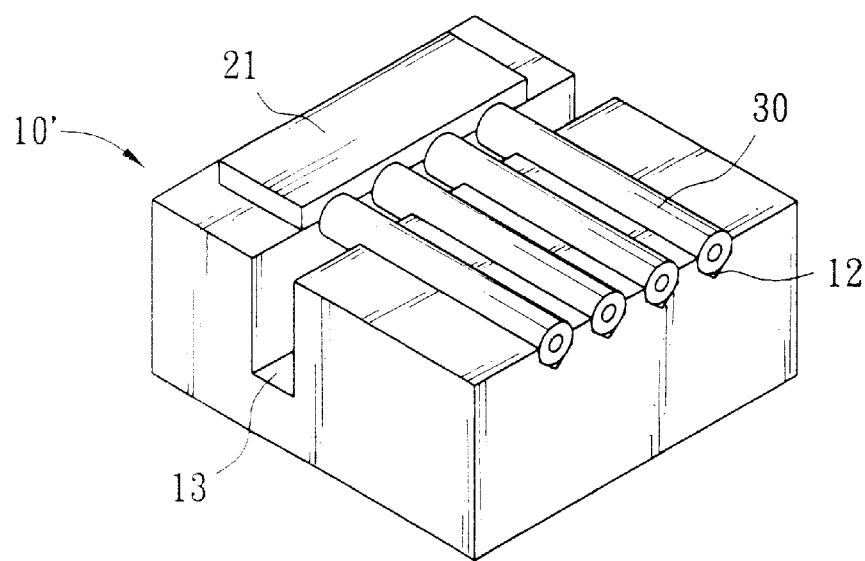
FIG. 6 shows a schematic view of the module assembly of the VCSEL array.

Referring to FIG. 2, when the silicon substrate 10 is completed, the flip chip technology and a plurality of solders 14 are employed to fix an optoelectronic device 20 on the silicon substrate 10. Finally, the optical fiber 30 is attached into the V-groove 12 of the silicon substrate 10. The completed optoelectronic module is shown in FIG. 3. The cross-sectional view of the V-groove 12 with an optical fiber 30 is shown in FIG. 5.

The optoelectronic device 20 is selected from the group comprising a vertical cavity surface-emitting laser (VCSEL), a laser-emitting diode (LED) and a photodiode. Alternatively, it can be an array optoelectronic device 21 composed of a plurality of VCSELs, LEDs or photodiodes. If an array optoelectronic device 21 is assembled on the silicon substrate 10, then a plurality of V-grooves 12 has to be provided to accommodate a plurality of optical fibers 30 so as to couple the laser beams radiating from the array optoelectronic device 21.

Figure 4:
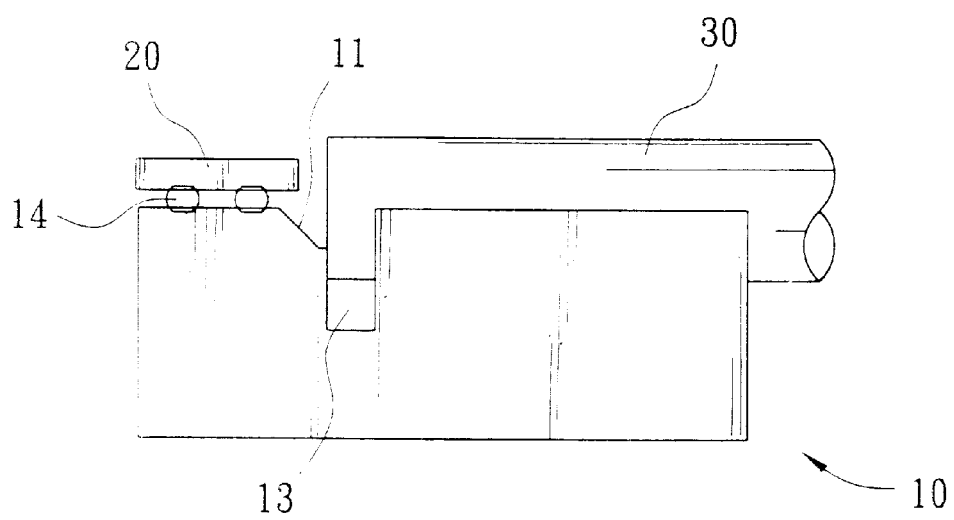
FIG. 4 shows a schematic cross-section of the optoelectronic module of FIG. 3.

Referring to FIG. 4, the optoelectronic module of the invention uses the complete silicon substrate 10 to accommodate the optical fiber 30 by passive alignment. The flip chip technology is used to combine the surface-emitting optoelectronic device 20 on the silicon substrate 10. Through the reflection of the 45-degree mirror surface 11, the laser beams emanating from the optoelectronic device 20 can be coupled into the optical fiber 30 in parallel. Thus, it can prevent the problem of misalignment due to separate assemblies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for making an integrated surface-emitting optoelectronic module that achieves the couplings between an optoelectronic device and an optical fiber by passive alignment, the method comprising the steps of:

applying photoresist on a silicon substrate and defining a V-groove area needed for disposing the optical fiber using the photolithography procedure;

forming a vertical groove within the defined groove area by dry etching and then removing the photoresist;

growing a dielectric layer on the silicon substrate using a furnace;

covering the whole area except the vertical groove with photoresist using the photolithography procedure and defining a mirror surface area needed for the optoelectronic device; and etching the vertical groove to form a V-groove by wet etching and etching the mirror surface area to form a mirror surface.

2. The method of claim 1 further comprising the steps of:

removing the photoresist and the dielectric layer; and cutting in the direction perpendicular to the V-groove to form a groove at one end of the disposed optical fiber in the V-groove to form a fixed end of the optical fiber.

3. The method of claim 1, wherein the crystal surface of the silicon substrate is selected from the group comprising the (100) surface and the surface obtained by cutting the (100) surface at an angle of 9.74 degrees.

4. The method of claim 1, wherein the material of the dielectric layer is selected from the group comprising silicon oxide and silicon nitride.

5. The method of claim 1, wherein the mirror surface is a 45-degree reflection mirror.

6. The method of claim 1, wherein the optoelectronic device is selected from the group comprising the combinations of a vertical cavity surface-emitting laser (VCSEL), a laser-emitting diode (LED) and a photodiode.

7. The method of claim 6, wherein the optoelectronic device is an array optoelectronic device composed of a plurality of the VCSELs, the LEDs or the photodiodes.

8. A method for making an integrated surface-emitting optoelectronic module comprising the steps of:

applying photoresist on a silicon substrate and defining a V-groove area needed for disposing the optical fiber using the photolithography procedure;

forming a vertical groove within the defined groove area by dry etching and then removing the photoresist;

growing a dielectric layer on the silicon substrate using a furnace;

covering the whole area except the vertical groove with photoresist using the photolithography procedure;

removing the level portion of the dielectric layer on the vertical groove by dry etching; and forming a V-groove at the vertical groove by wet etching.

9. The method of claim 8 further comprising the step of removing the photoresist and the dielectric layer.

10. The method of claim 8 further comprising the step of cutting in the direction perpendicular to the V-groove to form a groove at one end of the disposed optical fiber in the V-groove to form a fixed end of the optical fiber.

11. The method of claim 8, wherein the crystal surface of the silicon substrate is the (100) surface or a surface obtained by cutting the (100) surface by 9.74 degrees.

12. The method of claim 8, wherein the material of the dielectric layer is selected from the group comprising silicon oxide and silicon nitride.

* * * * *